(12) United States Patent
Xiong et al.

(10) Patent No.: US 10,836,032 B2
(45) Date of Patent: Nov. 17, 2020

(54) ROBOT AND LEG ASSEMBLY THEREOF

(71) Applicant: UBTECH Robotics Corp, Shenzhen (CN)

(72) Inventors: Youjun Xiong, Shenzhen (CN); Defu Liu, Shenzhen (CN); Gao Yang, Shenzhen (CN); Zuyi Mao, Shenzhen (CN); Xinpu Chen, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 6 days.

(21) Appl. No.: 16/288,119

(22) Filed: Feb. 28, 2019

(65) Prior Publication Data
US 2020/0180145 A1 Jun. 11, 2020

(30) Foreign Application Priority Data
Dec. 11, 2018 (CN) .......................... 2018 1 1510714

(51) Int. Cl.
| | |
|---|---|
| *B25J 9/10* | (2006.01) |
| *A63H 11/18* | (2006.01) |
| *B62D 57/032* | (2006.01) |
| *B25J 9/00* | (2006.01) |

(52) U.S. Cl.
CPC ............ *B25J 9/106* (2013.01); *B25J 9/0006* (2013.01); *B25J 9/0009* (2013.01); *A63H 11/18* (2013.01); *B62D 57/032* (2013.01)

(58) Field of Classification Search
CPC ....... A63H 11/18; B25D 57/032; B25J 9/106; B25J 9/006; B25J 9/0024; B25J 9/0009; B25J 17/00; F16H 37/12; F16H 37/122
See application file for complete search history.

(56) References Cited

U.S. PATENT DOCUMENTS

| | | | | |
|---|---|---|---|---|
| 2,667,719 A | * | 2/1954 | Edwardson ............ | A63H 11/18 446/355 |
| 5,224,896 A | * | 7/1993 | Terzian .................. | A63H 11/18 446/268 |
| 5,443,188 A | * | 8/1995 | Kotlarsky .............. | A63H 11/18 223/66 |
| 6,120,343 A | * | 9/2000 | Migliorati ............. | A63H 11/18 446/317 |

(Continued)

FOREIGN PATENT DOCUMENTS

| | | |
|---|---|---|
| CN | 206520675 U | 9/2017 |
| CN | 206606274 U | 11/2017 |
| GB | 794163 A * | 4/1958 ............. A63H 11/18 |

*Primary Examiner* — Bobby Rushing, Jr.

(57) ABSTRACT

A leg assembly of a robot comprising a waist includes a thigh rotatably coupled to the waist, a lower leg rotatably coupled to the thigh, a foot rotatably coupled to the lower leg, a servo fixe to the thigh, a first transmission mechanism configured to transmit motion from the servo to the thigh to drive the thigh to rotate with respect to the waist; a second transmission mechanism configured to transmit motion from the thigh to the lower leg to drive the lower leg to flex when the thigh move upward and extend when the thigh move downward; and a third transmission mechanism configured rotatably connected to the thigh and the foot in such a way that the foot dorsiflexes from an original position when the lower leg is flexing and rotates back toward the original position when the lower leg is extending.

18 Claims, 12 Drawing Sheets

(56) References Cited

U.S. PATENT DOCUMENTS

| | | | | |
|---|---|---|---|---|
| 7,278,501 B2* | 10/2007 | Mori | ............... | B25J 9/1641 |
| | | | | 180/8.5 |
| 8,327,959 B2* | 12/2012 | Lee | ............... | A63H 11/00 |
| | | | | 180/8.6 |
| 8,956,198 B1* | 2/2015 | Chang | ............... | A63H 11/18 |
| | | | | 446/433 |
| 2002/0193045 A1* | 12/2002 | Lee | ............... | A63H 11/18 |
| | | | | 446/330 |
| 2003/0017779 A1* | 1/2003 | Sakai | ............... | A63H 13/00 |
| | | | | 446/226 |
| 2019/0091592 A1* | 3/2019 | Gillies | ............... | A63H 11/20 |

* cited by examiner

ROBOT AND LEG ASSEMBLY THEREOF

CROSS REFERENCE TO RELATED APPLICATIONS

This application claims priority to Chinese Patent Application No. 201811510714.1, filed Dec. 11, 2018, which is hereby incorporated by reference herein as if set forth in its entirety.

BACKGROUND

1. Technical Field

The present disclosure generally relates to robots, and particularly to a robot and its leg.

2. Description of Related Art

A servo is a key component of some robots. Generally, one servo can provide one rotational degree of freedom. In order to imitate human actions, a humanoid robot usually needs many servos to provide the same amount of rotational degrees of freedom. It is useful and desirable to provide a robot that needs fewer servos.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 10:
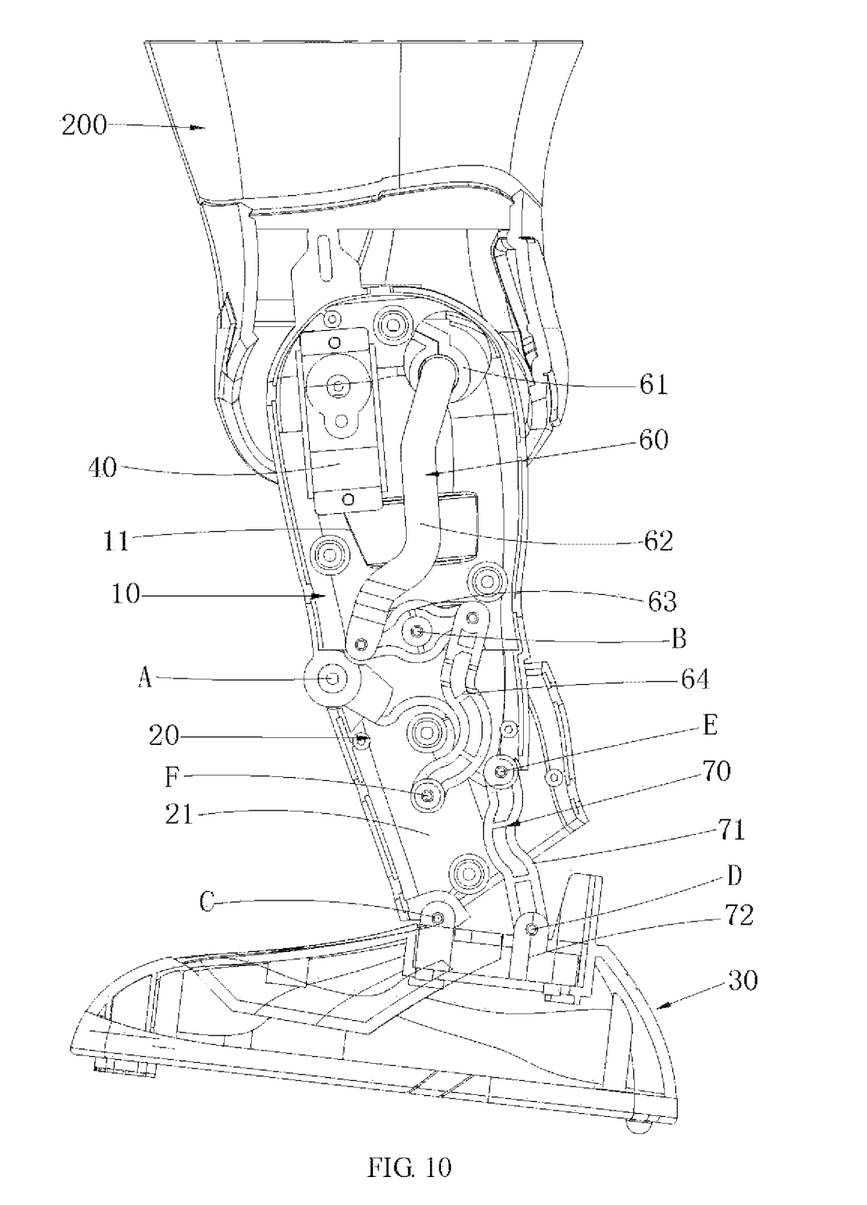
FIGS. 10 and 11 are side views of the leg assembly of FIG. 9 whose lower leg is in a slightly flexed state.
Figure 11:
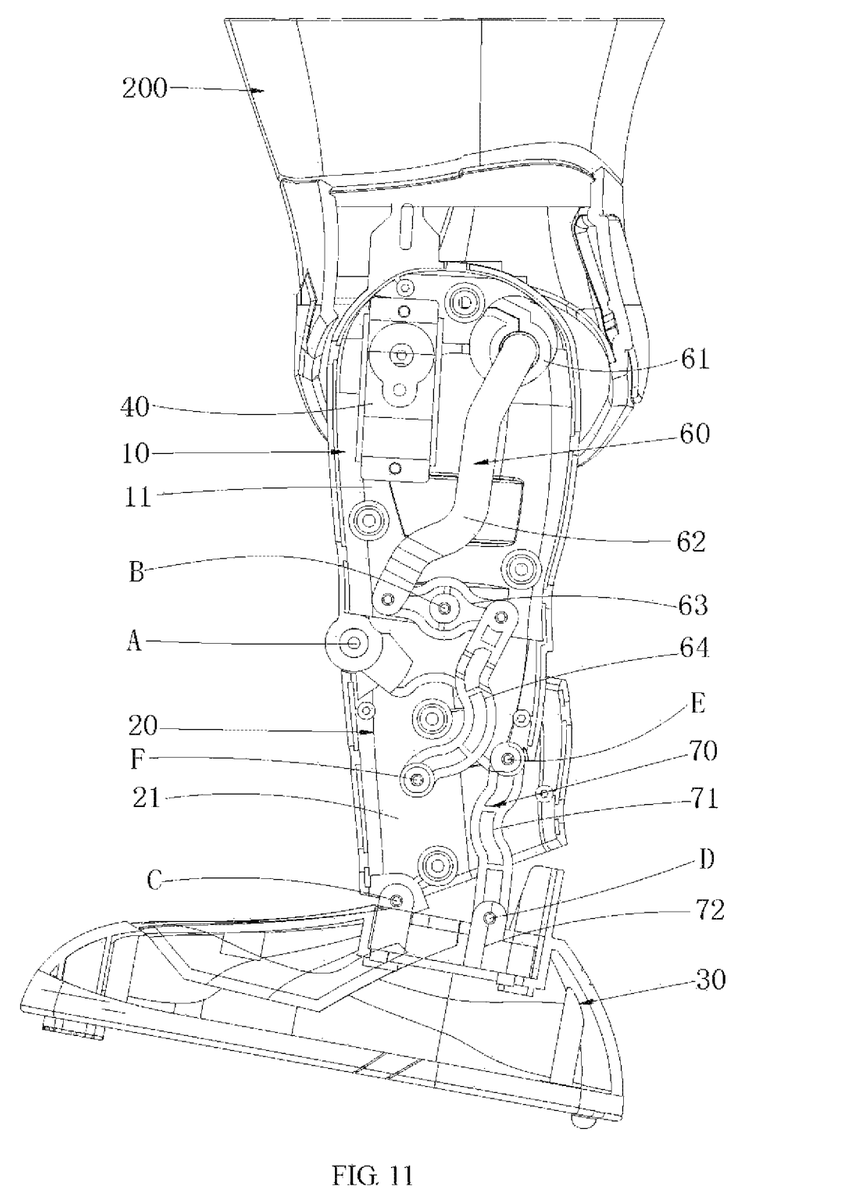
Figure 12:
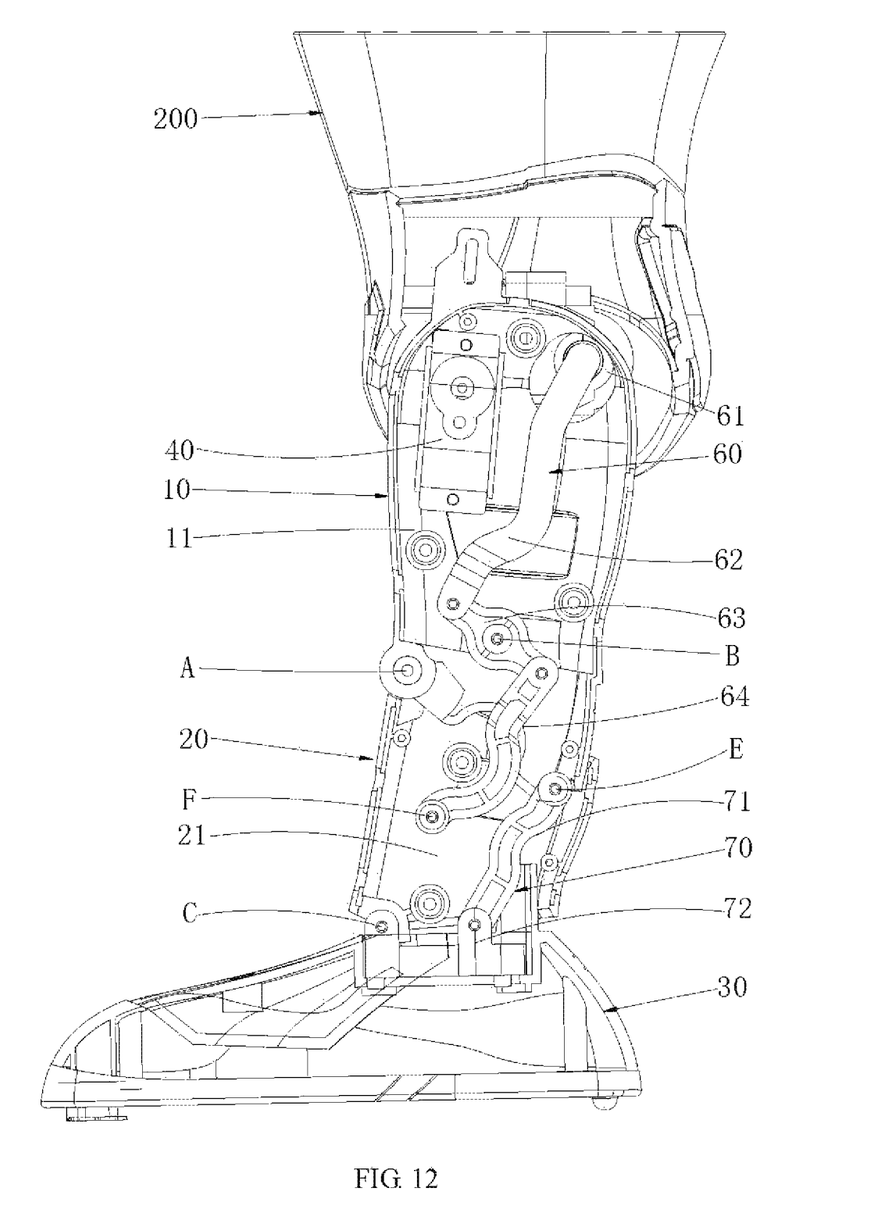
FIG. 12 is a side view of the leg assembly of the robot of FIG. 1, with certain components omitted.

Referring to FIGS. 1 and 7-9, in one embodiment, a leg assembly 1000 of a robot including a waist 200 includes a thigh 10 rotatably coupled to the waist 200, a lower leg 20 rotatably coupled to the thigh 10, a foot 30 rotatably coupled to the lower leg 20, a servo 40 fixed to the thigh 10, a first transmission mechanism 50 to transmit motion from the servo 40 to the thigh 10 to drive the thigh 10 to rotate with respect to the waist, a second transmission mechanism 60 to transmit motion from the thigh 10 to the lower leg 20 to drive the lower leg 20 to flex (see FIGS. 9 and 10) when the thigh moves upward and extend (see FIGS. 11 and 12) when the thigh moves downward; and a third transmission mechanism 70 rotatably connected to the thigh 10 and the foot 30 in such a way that the foot 30 dorsiflexes (see FIGS. 10 and 11) from an original position when the lower leg 20 is flexing and rotates back toward the original position when the lower leg 20 extending.

Compared to conventional humanoid robots including three servos to drive the thigh, the lower leg and the foot of a leg thereof, the leg assembly of the present embodiment drives the thigh, the lower leg and the foot using only one servo, which can reduce cost.

Figure 1:
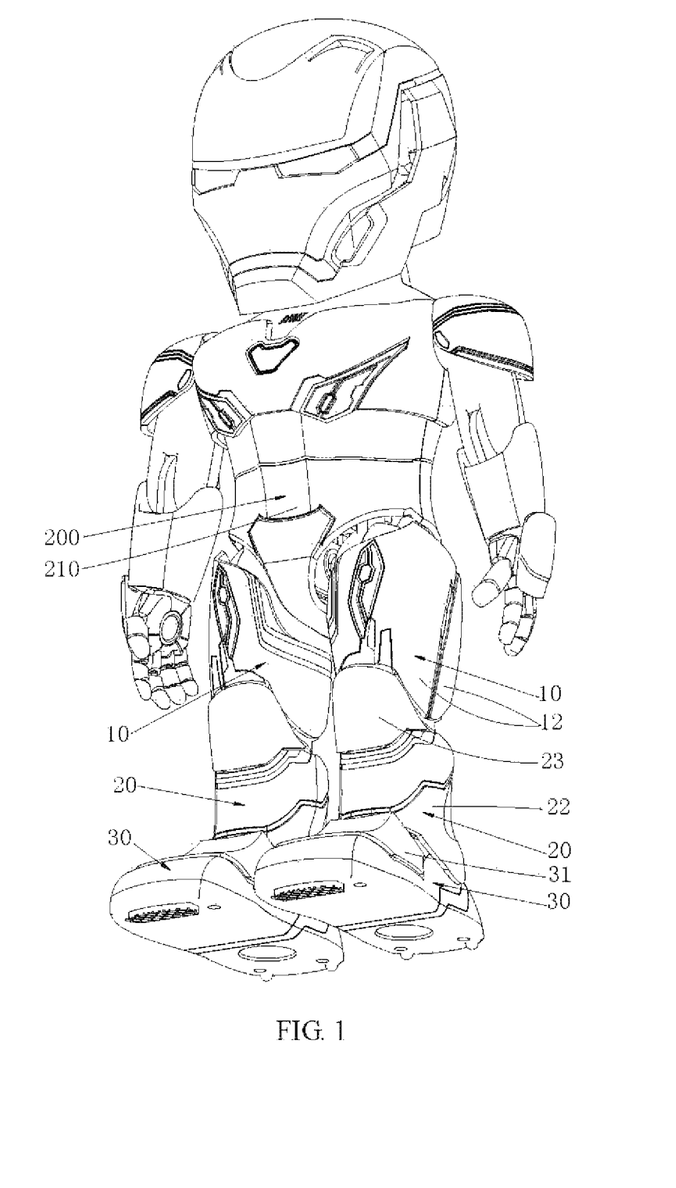
FIG. 1 is an isometric view of a robot according to one embodiment.
Figure 2:
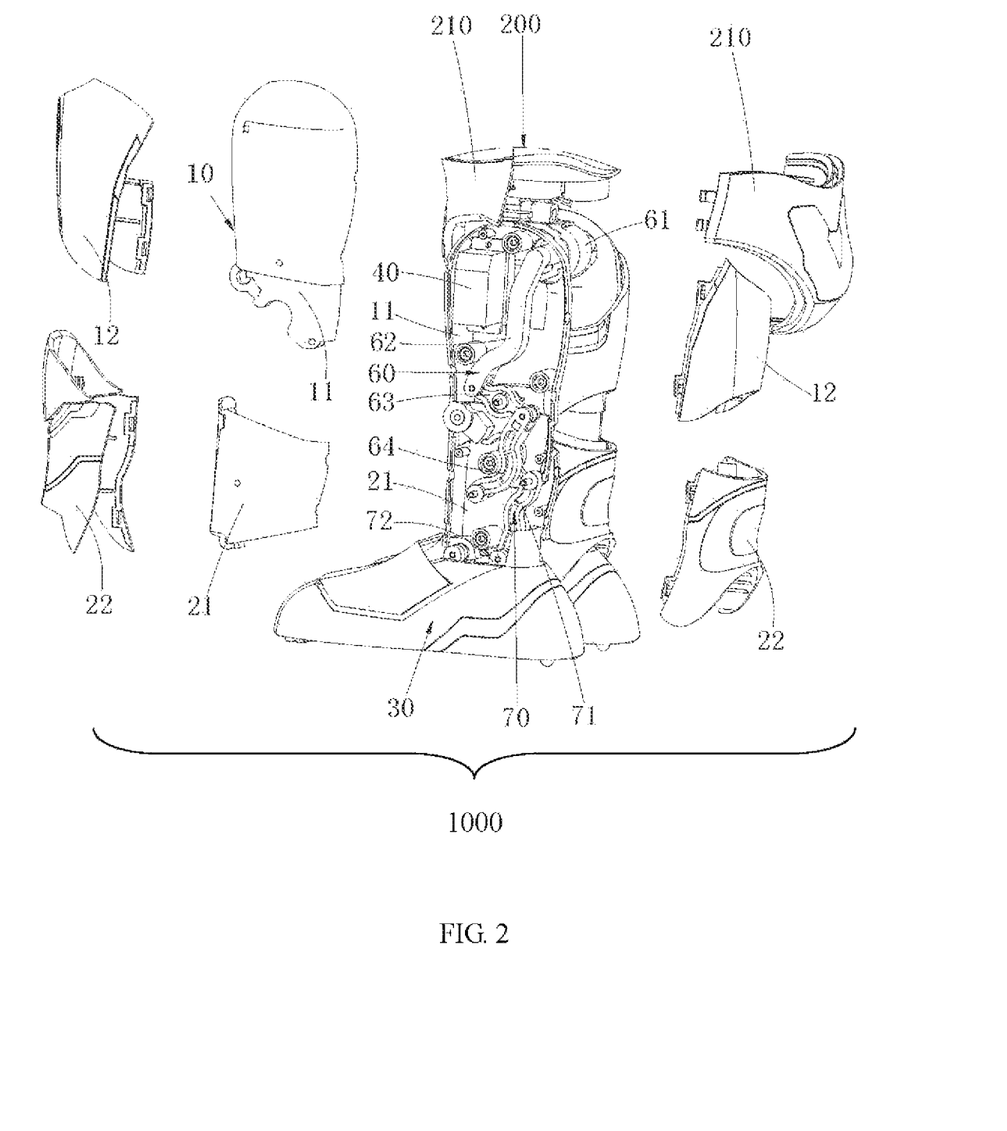
FIG. 2 is an isometric exploded view of a leg assembly of the robot of FIG. 1.

Referring to FIGS. 1 and 2, the thigh 10 includes two thigh shells 11 coupled to each other. The lower leg 20 includes two lower-leg shells 21 coupled to each other. Two thigh shields 12 are respectively attached to the two thigh shells 11, and two lower-leg shields 22 are respectively attached to the two lower-leg shells 21. A knee shield 23 is to a pivotal joint between the thigh 10 and the lower leg 20. A foot shield 31 is attached to the foot 30. The first transmission mechanism 50 is arranged within the space defined by the thigh shells 11. When the first transmission mechanism 50 is shared by two leg assemblies of a robot, it is arranged between two thigh shells 11 of the two leg assemblies. The waist 200 includes two waist shells 210. The servo 40 is arranged within the space defined by the thigh shells 11. The servo 40 is connected to a main control processor of the robot and executes a rotation command from the main control processor. An output shaft 41 of the servo 40 passes through a first through hole 113 of the thigh shell 11 adjacent to the other leg assembly 1000 of the robot.

Referring to FIGS. 5-8, in one embodiment, the first transmission mechanism 50 includes a holder 51 fixed to the waist 200 and a rotating member 52 rotatably connected to the holder 51 about a center axis thereof. The output shaft 41 of the servo 40 is fixed to the rotating number 52 and offset from the center axis. The holder 50 defines a cavity 511 to receive the rotating member 52 therein. In the embodiment, the holder 51 is integrally formed with a front casing 210 of the waist 200. A fixing frame 61, which will be described in detail later, is fixed to the front casing 210 and located at one end of the holder 50. The fixing frame 61 covers an open end of the cavity 511, thereby holding the rotating member 52 in the cavity 511. The rotating member 52 is circular and the cavity 511 is sized and shaped in such a way that the rotating member 52 is rotatable in the cavity 511. When the output shaft 41 of the servo 40 rotates, the rotating member 52 is driven to rotate in the cavity 511. The servo 40 then rotates together with the rotating member 52 about the center axis of the rotating member 52. As a result, the thigh 10 rotates together with the servo 40 about the center axis of the rotating member 52. In the embodiment, the output shaft 41 of the servo 40 and the rotating member 52 are connected to each other by profile shaft connection that is a connection technique that uses a shaft and a shaft hole both having non-circular cross section.

Figure 8:
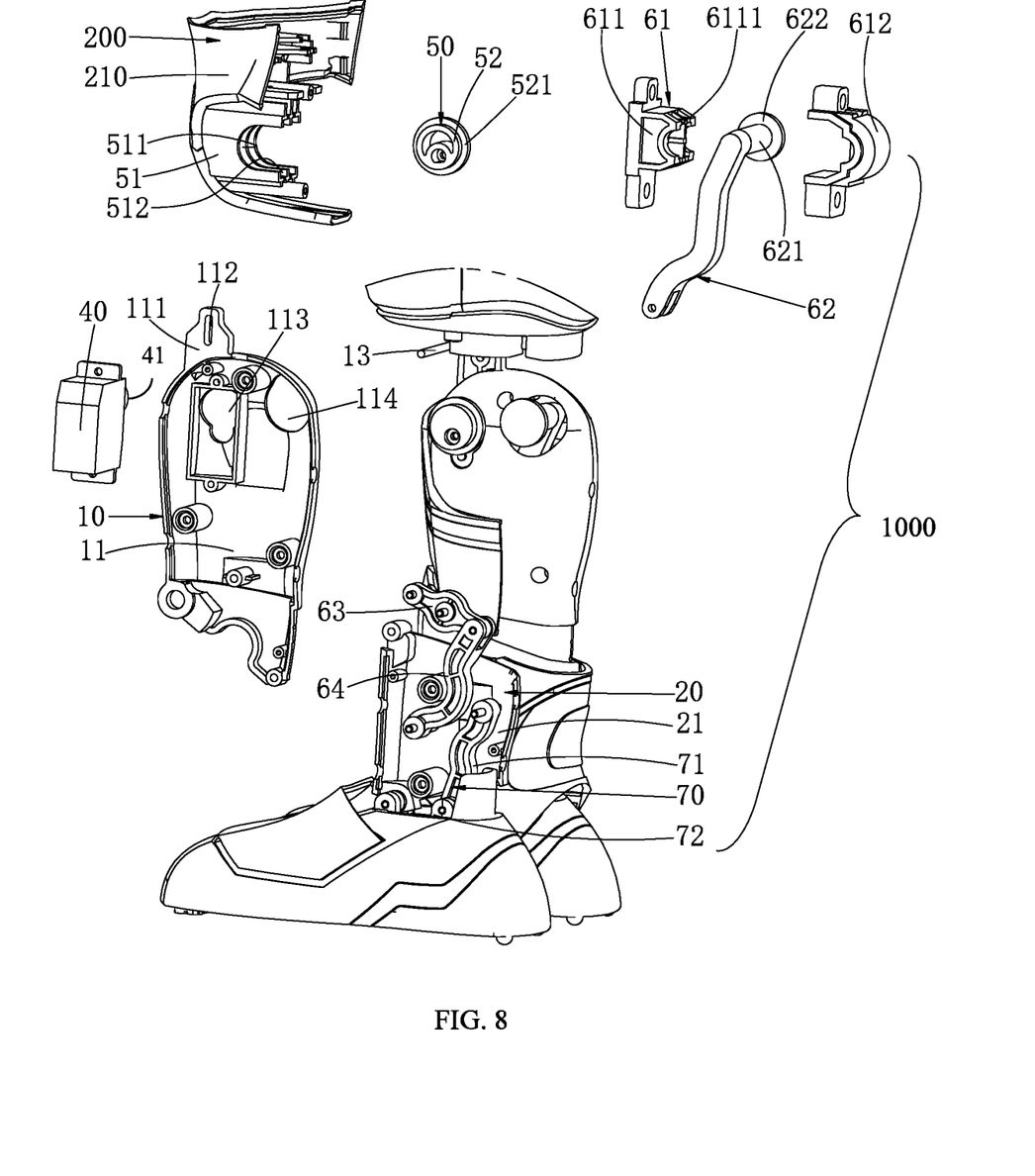
FIG. 8 is similar to FIG. 2 with more components separated.

Referring to FIG. 8, in one embodiment, a ring portion 521 projects radially outwardly from a lateral surface of the rotating member 52. The holder 51 defines a receiving groove 512 to receive the ring portion 521 so as to prevent an axial movement of the rotating member 52 with respect to the holder 51. In the embodiment, the receiving groove 512 is defined in a lateral surface of the cavity 511. Such configuration facilitates positioning and assembly of the rotating member 52, ensuring that two first transmission mechanisms 50 are not interfered with each other such that two leg assemblies of the robot can operate normally. The main body 611 of the fixing frame 61 defines a receiving groove in a side facing the rotating member 52 for receiving the ring portion 521 of the rotating member 52.

Referring to FIGS. 3-5 and 9, in one embodiment, the second transmission mechanism 60 includes the fixing frame 61 fixed to the waist 200, a first linkage bar 62, a second linkage bar 63 and a third linkage bar 64. The first linkage bar 62 has a top end rotatably connected to the fixing frame 61 and a bottom end. The second linkage bar 63 is rotatably connected, at a center, to the thigh 10 and includes a first end rotatably connected to the bottom end of the first linkage bar 62 and a second end. The third linkage bar 64 includes a lower end rotatably connected to the lower leg 20 and an upper end rotatably connected to the second end of the second linkage bar 63. A rotation axis A around which the thigh 10 rotates with respect to the lower leg 20 is located in front of a rotation axis B around which the second linkage bar 63 rotates with respect to the thigh 10. With such configuration, the lower leg 20 can rotate as stated above. Specifically, as the output shaft 41 of the servo 40 rotates, the leg assembly 1000 keeps moving and the movement of the leg assembly 1000 involves cyclic movement consisting of two movement periods: upward movement and downward movement. During the upward movement, the leg assembly 1000 as a whole moves upward and the second linkage bar 63 moves upward together with the thigh 10. As a result, the first end of the second linkage bar 63 that is connected to the first linkage bar 62 is pushed by the first linkage bar 62 to move downward, causing the second linkage bar 63 to rotate in a counterclockwise direction (see FIGS. 9 and 10). The third linkage bar 64 is then pulled to move upward and applies a pulling force to the lower leg 20, cause the lower leg to flex. That is, the lower leg 20 is pulled by the third linkage bar 64 to rotate in a counterclockwise direction and away from the surface (e.g., the ground) where the robot stands. During the downward movement, the second linkage bar 63 rotates in a clockwise direction and pushes the third linkage bar 64. The third linkage bar 64 then pushes the lower leg 20 to extend (see FIGS. 11 and 12). That is, the lower leg 20 rotates in a clockwise direction and toward the surface where the robot stands. The first linkage bar 62, the second linkage bar 63, the third linkage bar 64, and the lower leg 20 are connected to one another through pivot shafts.

Figure 4:
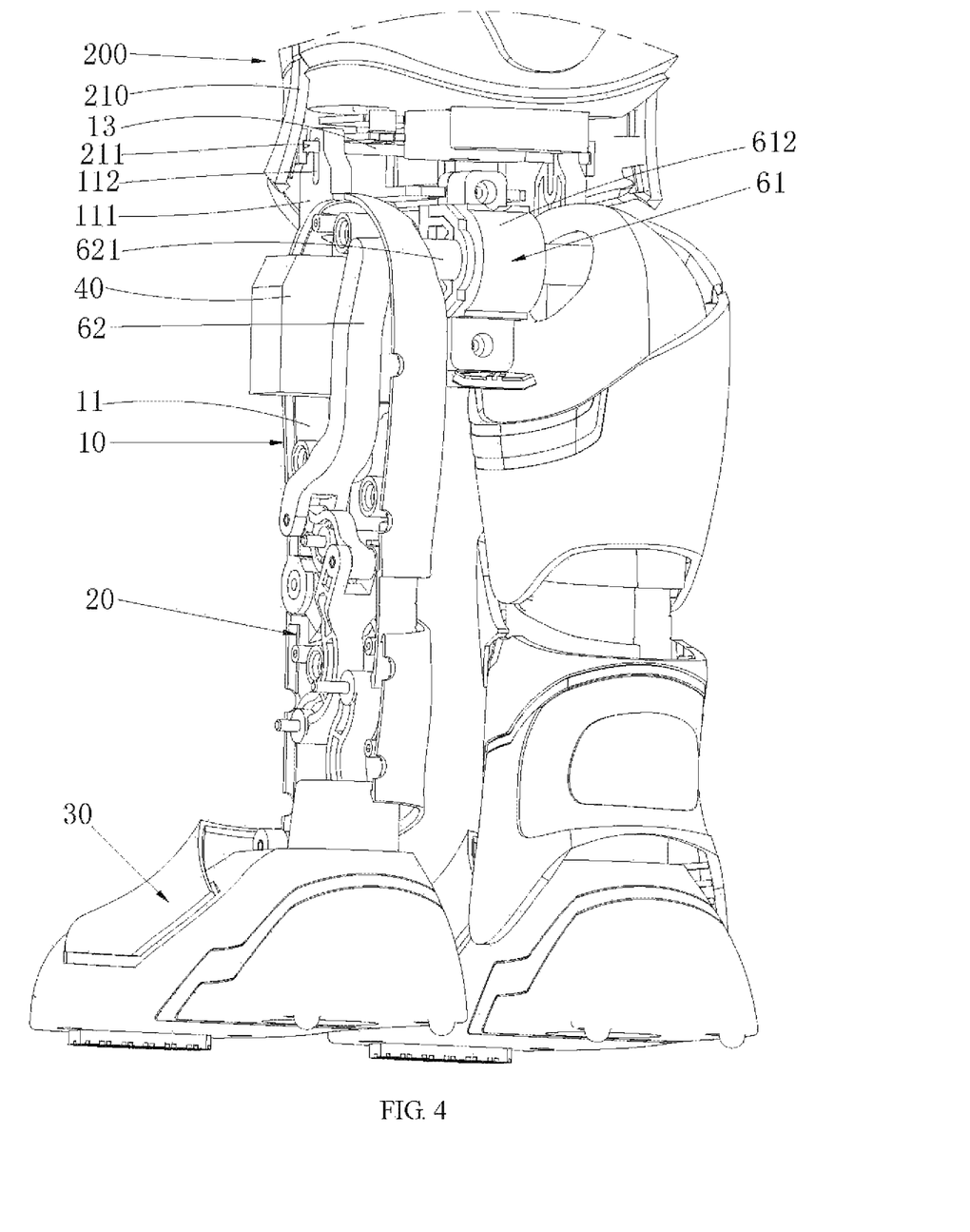
FIG. 4 is an isometric view of the leg assembly of the robot of FIG. 1, with certain components omitted for clarity.
Figure 7:
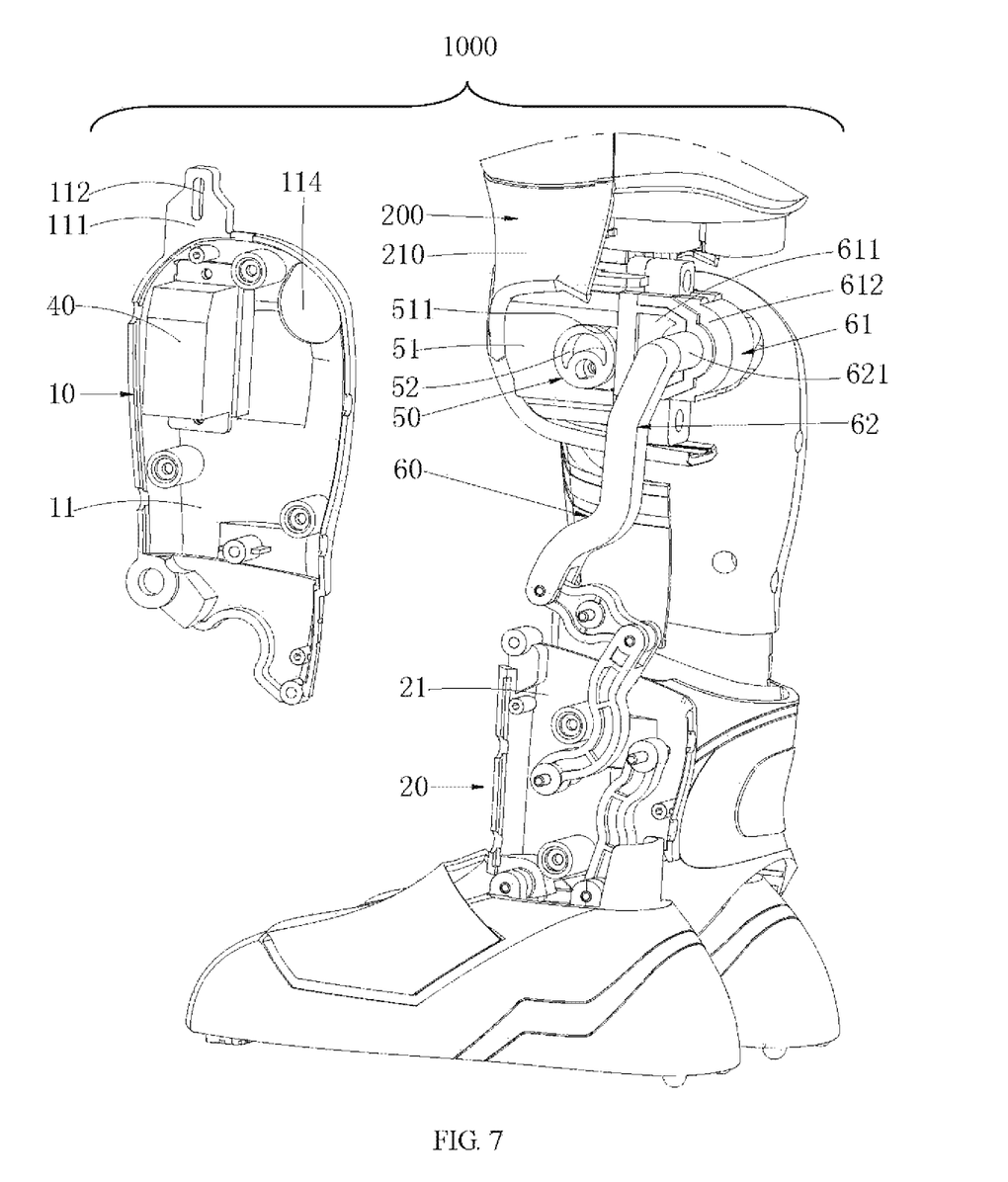
FIG. 7 is similar to FIG. 2 with many components omitted.

Referring to FIGS. 4 and 7-8, in one embodiment, the top end of the first linkage bar 62 includes an axle 621 that comprises a tab 622 at an end thereof. The fixing frame 61 defines a receiving groove 6111 to receive the tab 622 therein so as to rotatably connect the top end of the first linkage bar 62 to the fixing frame 61. The fixing frame 61 includes the main body 611 and a cover 612. The receiving groove 6111 is formed in the main body 611 and the cover 612. After the cover 612 is fixed to the main body 611, the tab 622 is held the receiving groove 6111 and the axle 621 can only rotate but cannot move axially. With such configuration, it ensures that two second transmission mechanisms 60 are not interfered with each other such that two leg assemblies of the robot can operate normally. The axles 621 of the first linkage bars 62 of the two second transmission mechanisms 60 share the fixing frame 61. The axle 621 passes through a through hole 114 of the thigh 10, and the tab 622 is connected to the fixing frame 61.

Figure 5:
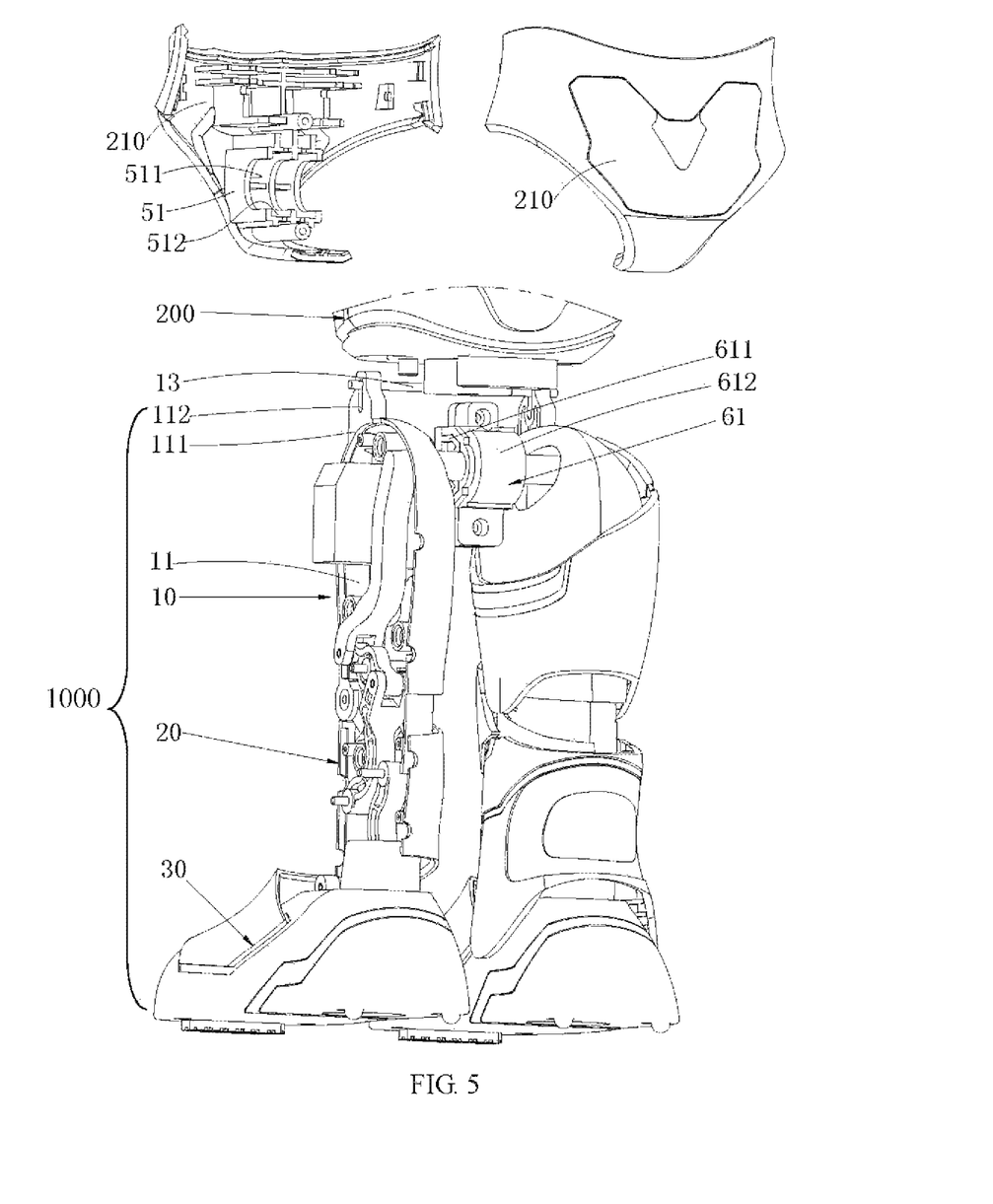
FIG. 5 is similar to FIG. 4 with waist shells of the robot separated from the leg assembly.
Figure 6:
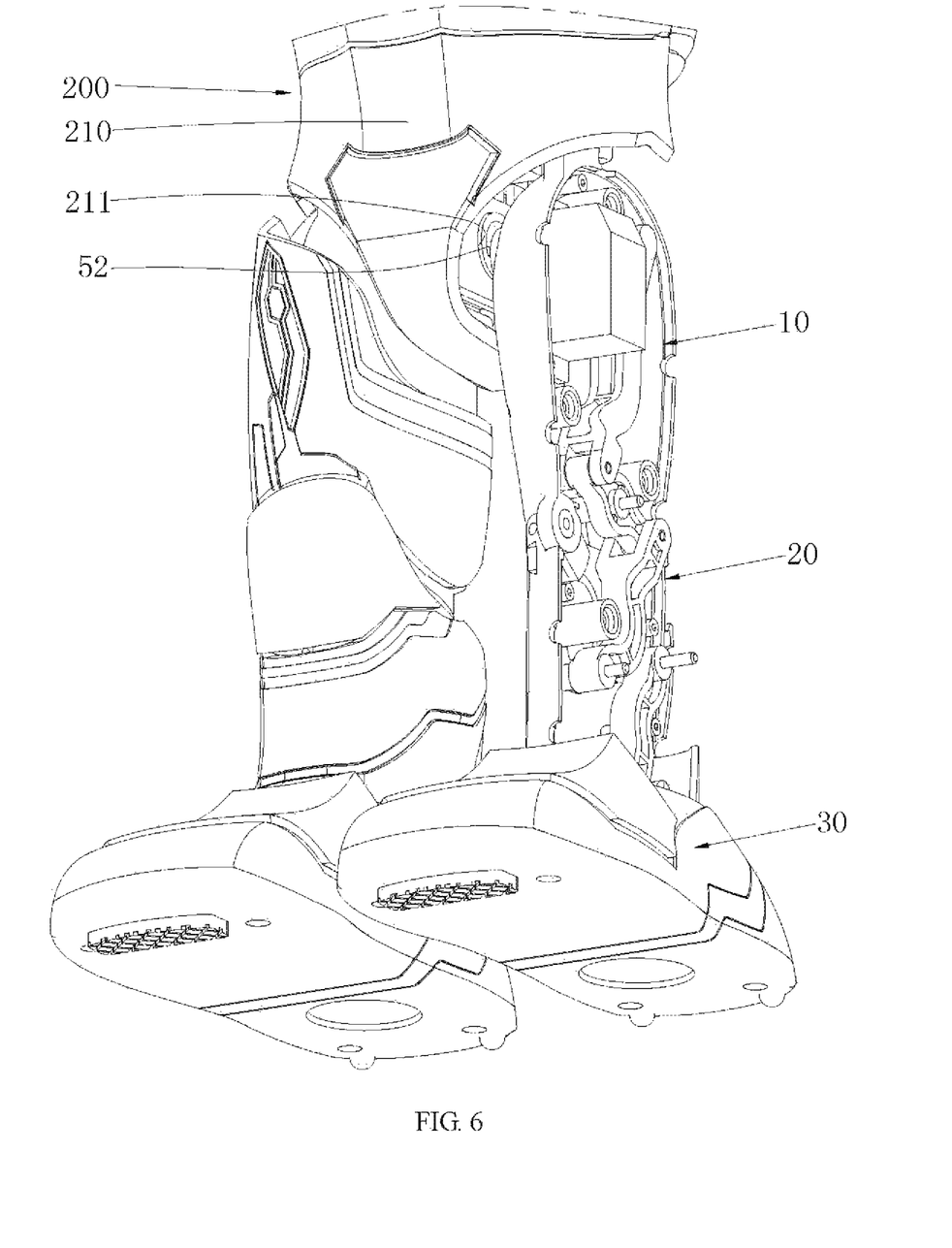
FIG. 6 is similar to FIG. 4 but viewed from a different perspective.
Figure 9:
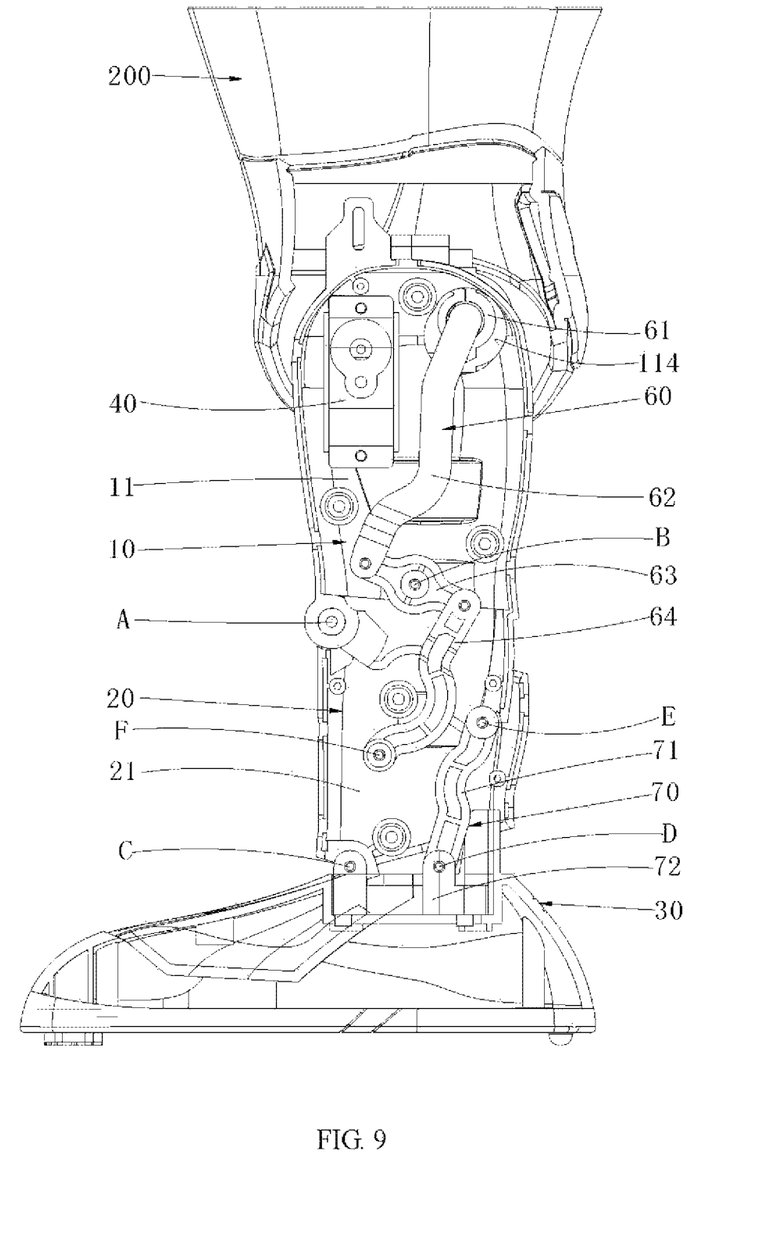
FIG. 9 is a side view of the leg assembly of the robot of FIG. 1, with certain components omitted.

Referring to FIGS. 5 and 9, in one embodiment, the third transmission mechanism 70 includes a fourth linkage bar 71 having two opposite ends that are rotatably connected to the thigh 10 and the foot 30. A rotation axis C around which the lower leg 20 rotates with respect to the foot 30 is located in front of a rotation axis D around which the fourth linkage bar 71 rotates with respect to the foot 30. A rotation axis F around which the third linkage bar 64 rotates with respect to the lower leg 20 is located in front of a rotation axis E around which the fourth linkage bar 71 rotates with respect to the thigh 10. With such configuration, the thigh 10, the lower leg 20, the foot 30 and the fourth linkage bar 71 constitute a four-bar linkage mechanism, which allows the foot 30 to rotate as stated above. Specifically, the foot 30 is pushed by fourth linkage bar 71 and dorsiflexes from an original position (see FIG. 9) when the lower leg 20 is flexing and rotates back toward the original position when the lower leg 20 is extending (see FIGS. 11 and 12). The fourth linkage bar 71, the thigh 10 and the foot 30 are connected to one another through pivot shafts.

Figure 3:
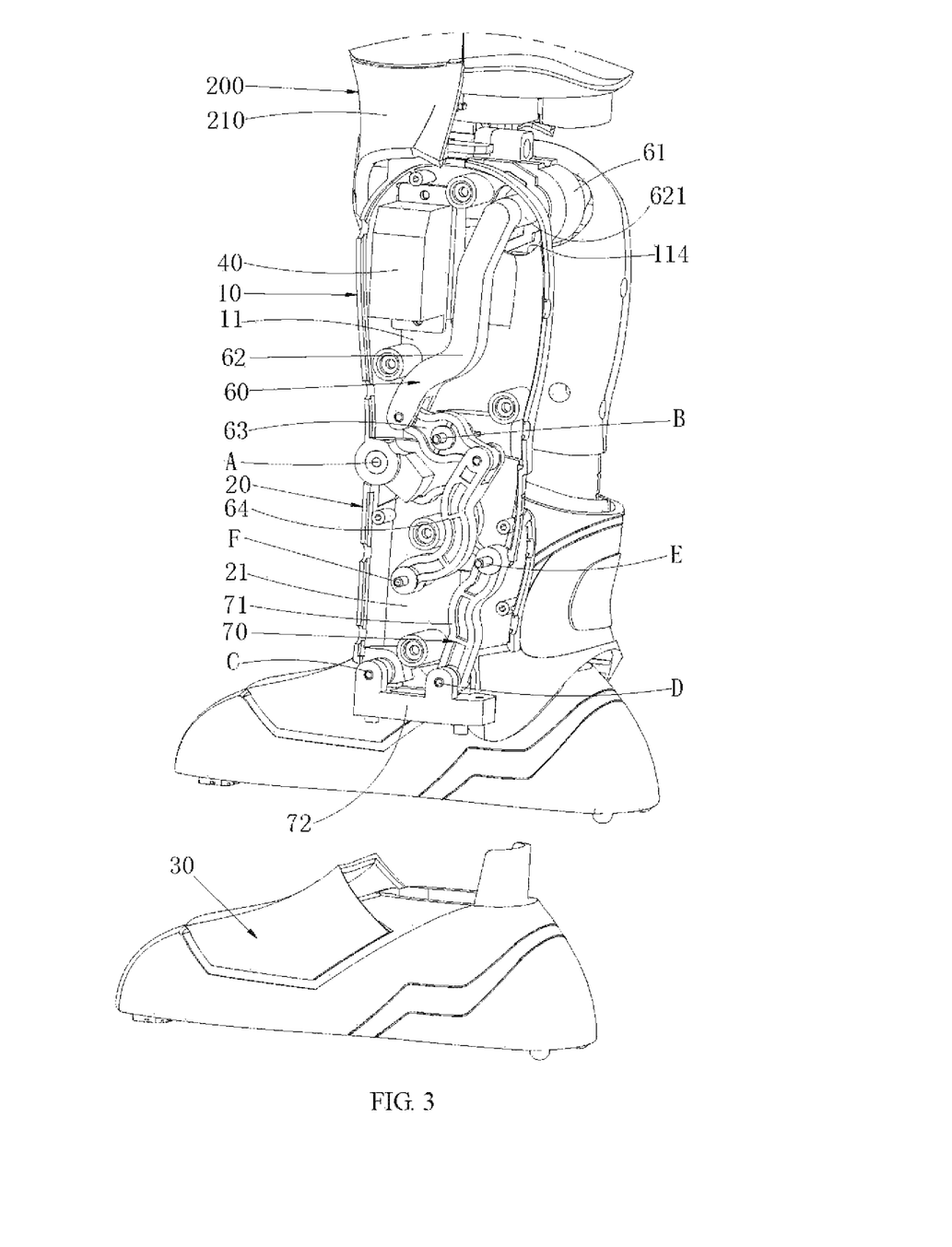
FIG. 3 is an isometric partially exploded view of the leg assembly of the robot of FIG. 1, with certain components omitted for clarity.

Referring to FIGS. 3 and 9, in one embodiment, the rotation axis A around which the thigh 10 rotates with respect to the lower leg 20 is above the rotation axis E around which the fourth linkage bar 71 rotates with respect to the thigh 10. With such configuration, the foot 30 can rotate as stated above.

Referring to FIGS. 3 and 9, in one embodiment, the foot 30 includes a mounting member 72. The lower leg 20 and the fourth linkage bar 71 are rotatably connected to the mounting member 72.

Referring to FIGS. 4 and 5, in one embodiment, a stopper limit member 13 is fixed to the waist 200. The thigh 10 includes a tab 111 defining a sliding groove 112. The stopper limit member 13 is received in the sliding groove 112 so as to limit the thigh 10 to move in a predetermined range. Opposite ends of the stopper limit member 13 are fit in mounting holes 211 of the waist shells 210 so as to fix the stopper limit member 13 to the waist 200. The sliding groove 112 extends in a vertical direction when the leg assembly 1000 is upright. When the stopper limit member 13 comes into contact with any of the two ends of the sliding groove 112, movement of the thigh 10 is stopped. In the embodiment, the stopper limit member 13 passes through the sliding grooves 112 of the thighs 10 of the two leg assemblies of the robot so as to limit the thighs 10 to move in a predetermined range.

The above-mentioned pivotal connection of two structural members can be achieved through a pivot shaft.

A robot decoding to an embodiment includes the waist 200 and the leg assembly 1000 as stated above. Compared to conventional humanoid robots including three servos to drive the thigh, the lower leg and the foot of a leg thereof, the leg assembly of the present embodiment drives the thigh, the lower leg and the foot using only one servo, which can reduce cost.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A leg assembly of a robot comprising a waist, the leg assembly comprising:
   a thigh rotatably coupled to the waist;
   a lower leg rotatably coupled to the thigh;
   a foot rotatably coupled to the lower leg;
   a servo fixed to the thigh;
   a first transmission mechanism configured to transmit motion from the servo to the thigh to drive the thigh to rotate with respect to the waist;
   a second transmission mechanism configured to transmit motion from the thigh to the lower leg to drive the lower leg to flex when the thigh moves upward and extend when the thigh moves downward; and
   a third transmission mechanism configured rotatably connected to the thigh and the foot in such a way that the foot dorsiflexes from an original position when the lower leg is flexing and rotates back toward the original position when the lower leg is extending;
   wherein the first transmission mechanism comprises a holder fixed to the waist and a rotating member rotatably connected to the holder about a center axis thereof, the servo is rotatable together with the rotating member and the thigh about the center axis of the rotating member.

2. The leg assembly of claim 1, wherein the servo comprises an output shaft that is fixed to the rotating member and offset from the center axis of the rotating member.

3. The leg assembly of claim 2, wherein a ring portion projects radially outwardly from a lateral surface of the rotating member, the holder defines a receiving groove to receive the ring portion so as to prevent an axial movement of the rotating member with respect to the holder.

4. The leg assembly of claim 1, wherein the second transmission mechanism comprises a fixing frame fixed to the waist, a first linkage bar, a second linkage bar and a third linkage bar, the first linkage bar comprises a top end rotatably connected to the fixing frame and a bottom end, the second linkage bar is rotatably connected to the thigh and comprises a first end rotatably connected to the bottom end of the first linkage bar and a second end, the third linkage bar comprises a lower end rotatably connected to the lower leg and an upper end rotatably connected to the second end of the second linkage bar, a rotation axis around which the thigh rotates with respect to the lower leg is located in front of a rotation axis around which the second linkage bar rotates with respect to the thigh.

5. The leg assembly of claim 4, wherein the top end of the first linkage bar comprises an axle that comprises a tab at an end thereof, the fixing frame defines a receiving groove to receive the tab therein so as to rotatably connect the top end of the first linkage bar to the fixing frame.

6. The leg assembly of claim 4, wherein the third transmission mechanism comprises a fourth linkage bar comprising two opposite ends that are rotatably connected to the thigh and the foot, a rotation axis around which the lower leg rotates with respect to the foot is located in front of a rotation axis around which the fourth linkage bar rotates with respect to the foot, and a rotation axis around which the third linkage bar rotates with respect to the lower leg is located in front of a rotation axis around which the fourth linkage bar rotates with respect to the thigh.

7. The leg assembly of claim 6, wherein the rotation axis around which the thigh rotates with respect to the lower leg is above the rotation axis around which the fourth linkage bar rotates with respect to the thigh.

8. The leg assembly of claim 6, wherein the foot comprising a mounting member, the lower leg and the fourth linkage bar are rotatably connected to the mounting member.

9. The leg assembly of claim 1 further comprising a stopper limit member fixed to the waist, wherein the thigh comprises a tab defining a sliding groove, the stopper limit member is received in the sliding groove so as to limit the thigh to move in a predetermined range.

10. A robot comprising a waist and a leg assembly, the leg assembly comprising:
    a thigh rotatably coupled to the waist;
    a lower leg rotatably coupled to the thigh;
    a foot rotatably coupled to the lower leg;
    a servo fixed to the thigh;
    a first transmission mechanism configured to transmit motion from the servo to the thigh to drive the thigh to rotate with respect to the waist;
    a second transmission mechanism configured to transmit motion from the thigh to the lower leg to drive the lower leg to flex when the thigh moves upward and extend when the thigh moves downward; and
    a third transmission mechanism configured rotatably connected to the thigh and the foot in such a way that the foot dorsiflexes from an original position when the lower leg is flexing and rotates back toward the original position when the lower leg is extending;
    wherein the first transmission mechanism comprises a holder fixed to the waist and a rotating member rotatably connected to the holder about a center axis thereof, the servo is rotatable together with the rotating member and the thigh about the center axis of the rotating member.

11. A leg assembly of a robot comprising a waist, the leg assembly comprising:
    a thigh rotatably coupled to the waist;
    a lower leg rotatably coupled to the thigh;
    a foot rotatably coupled to the lower leg;
    a servo fixed to the thigh;
    a first transmission mechanism configured to transmit motion from the servo to the thigh to drive the thigh to rotate with respect to the waist;
    a second transmission mechanism configured to transmit motion from the thigh to the lower leg to drive the lower leg to flex when the thigh moves upward and extend when the thigh moves downward; and
    a third transmission mechanism configured rotatably connected to the thigh and the foot in such a way that the foot dorsiflexes from an original position when the lower leg is flexing and rotates back toward the original position when the lower leg is extending;

wherein the second transmission mechanism comprises a fixing frame fixed to the waist, a first linkage bar, a second linkage bar and a third linkage bar, the first linkage bar comprises a top end rotatably connected to the fixing frame and a bottom end, the second linkage bar is rotatably connected to the thigh and comprises a first end rotatably connected to the bottom end of the first linkage bar and a second end, the third linkage bar comprises a lower end rotatably connected to the lower leg and an upper end rotatably connected to the second end of the second linkage bar, a rotation axis around which the thigh rotates with respect to the lower leg is located in front of a rotation axis around which the second linkage bar rotates with respect to the thigh.

12. The leg assembly of claim 11, wherein the first transmission mechanism comprises a holder fixed to the waist and a rotating member rotatably connected to the holder about a center axis thereof, the servo comprises an output shaft that is fixed to the rotating member and offset from the center axis.

13. The leg assembly of claim 12, wherein a ring portion projects radially outwardly from a lateral surface of the rotating member, the holder defines a receiving groove to receive the ring portion so as to prevent an axial movement of the rotating member with respect to the holder.

14. The leg assembly of claim 11, wherein the top end of the first linkage bar comprises an axle that comprises a tab at an end thereof, the fixing frame defines a receiving groove to receive the tab therein so as to rotatably connect the top end of the first linkage bar to the fixing frame.

15. The leg assembly of claim 11, wherein the third transmission mechanism comprises a fourth linkage bar comprising two opposite ends that are rotatably connected to the thigh and the foot, a rotation axis around which the lower leg rotates with respect to the foot is located in front of a rotation axis around which the fourth linkage bar rotates with respect to the foot, and a rotation axis around which the third linkage bar rotates with respect to the lower leg is located in front of a rotation axis around which the fourth linkage bar rotates with respect to the thigh.

16. The leg assembly of claim 15, wherein the rotation axis around which the thigh rotates with respect to the lower leg is above the rotation axis around which the fourth linkage bar rotates with respect to the thigh.

17. The leg assembly of claim 15, wherein the foot comprising a mounting member, the lower leg and the fourth linkage bar are rotatably connected to the mounting member.

18. The leg assembly of claim 11 further comprising a stopper limit member fixed to the waist, wherein the thigh comprises a tab defining a sliding groove, the stopper limit member is received in the sliding groove so as to limit the thigh to move in a predetermined range.

* * * * *